United States Patent [19]

Wang

[11] Patent Number: 5,019,262

[45] Date of Patent: May 28, 1991

[54] HYDROPHILIC MICROPOROUS MEMBRANE

[75] Inventor: Ying Wang, Scarborough, Canada

[73] Assignee: International Applied Sciences, Inc., Pinebrook, N.J.

[21] Appl. No.: 418,275

[22] Filed: Oct. 6, 1989

[51] Int. Cl.$^5$ .............................................. B01Z 67/00
[52] U.S. Cl. ............................. 210/490; 210/500.27; 210/500.35; 131/332
[58] Field of Search .............. 210/490, 500.35, 500.42, 210/500.27; 55/16, 158; 131/332; 427/245, 244

[56] References Cited

U.S. PATENT DOCUMENTS 3,674,722  7/1972  Rainer et al. ................... 131/332 X
4,627,850 12/1986  Deters et al. .............. 210/500.35 X Primary Examiner—Frank Spear
Attorney, Agent, or Firm—Rogers, Bereskin & Parr

[57] ABSTRACT

A membrane that is prepared in an oil in water system and comprises a hydrophilic polymer film having controlled porosity. Such membranes are particularly well suited as filters for cigarettes and like products.

16 Claims, 2 Drawing Sheets

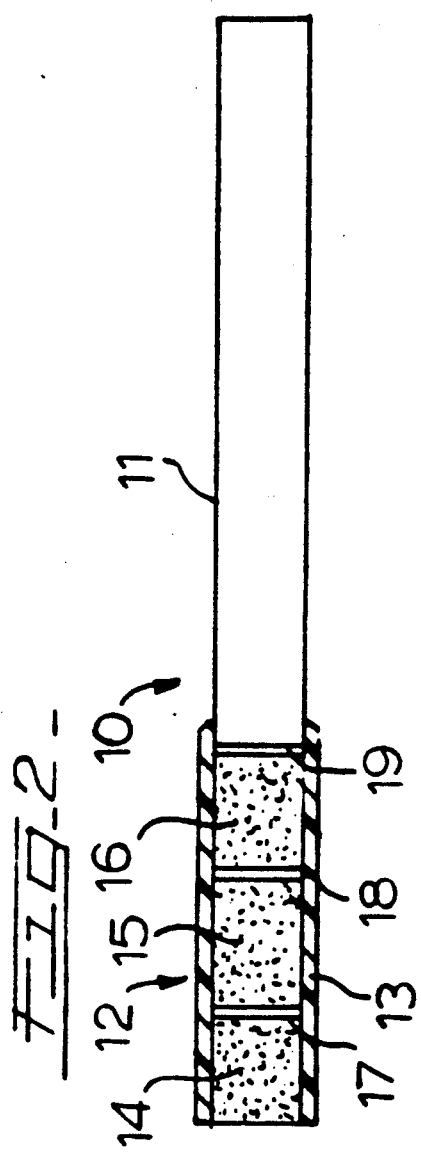
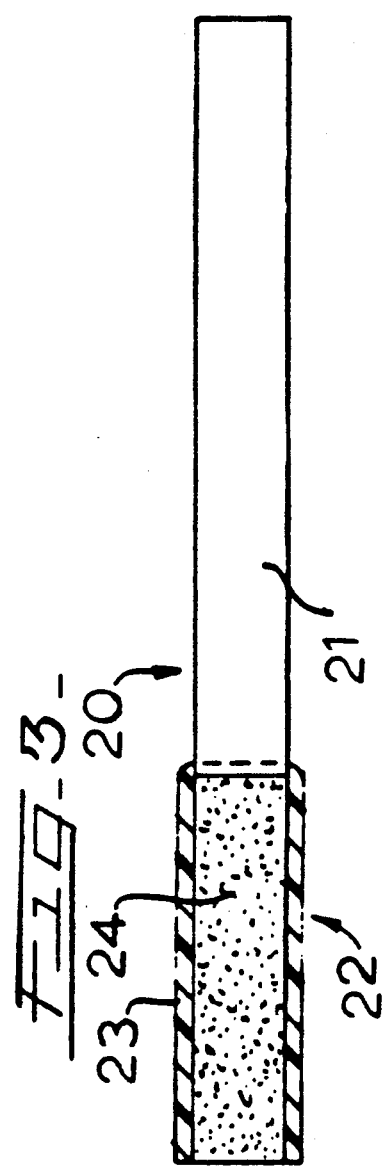
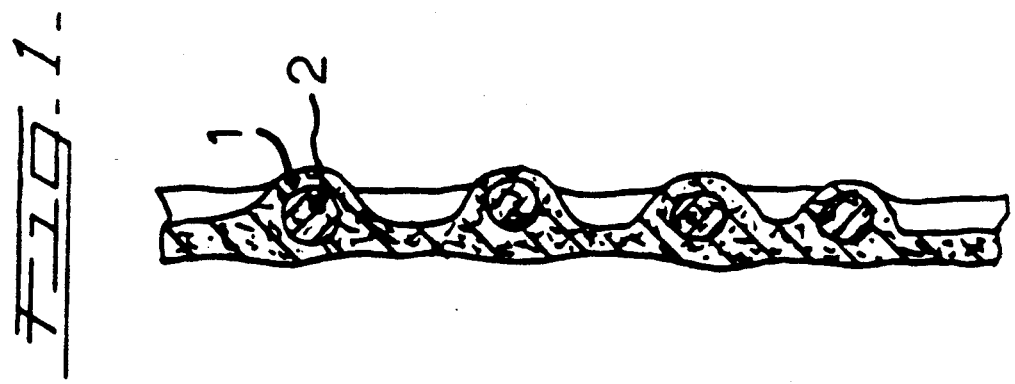

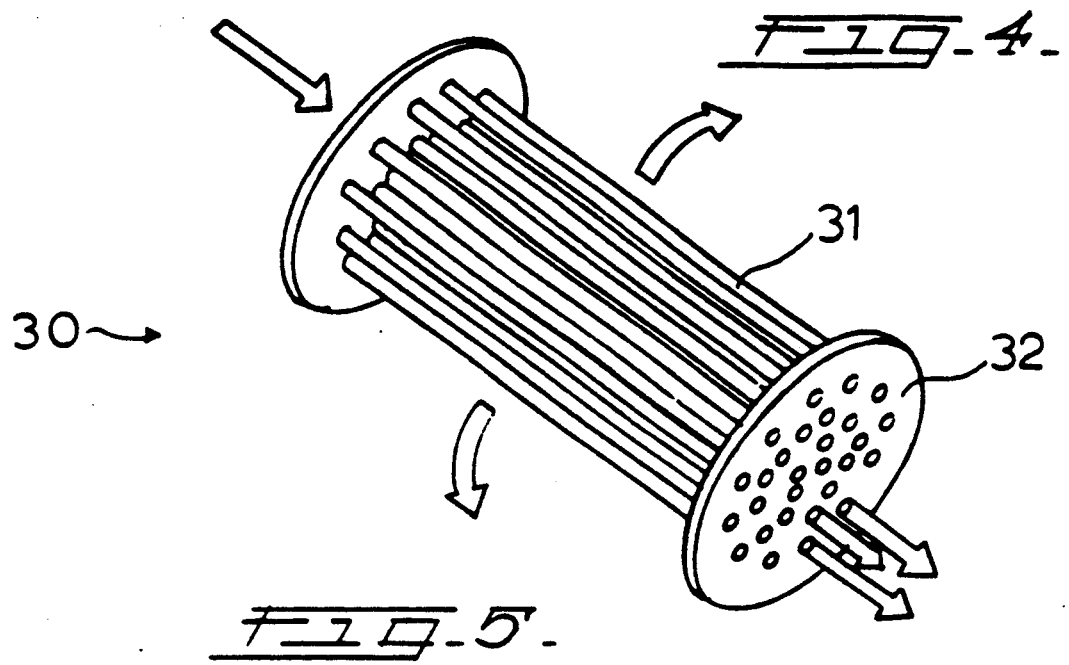
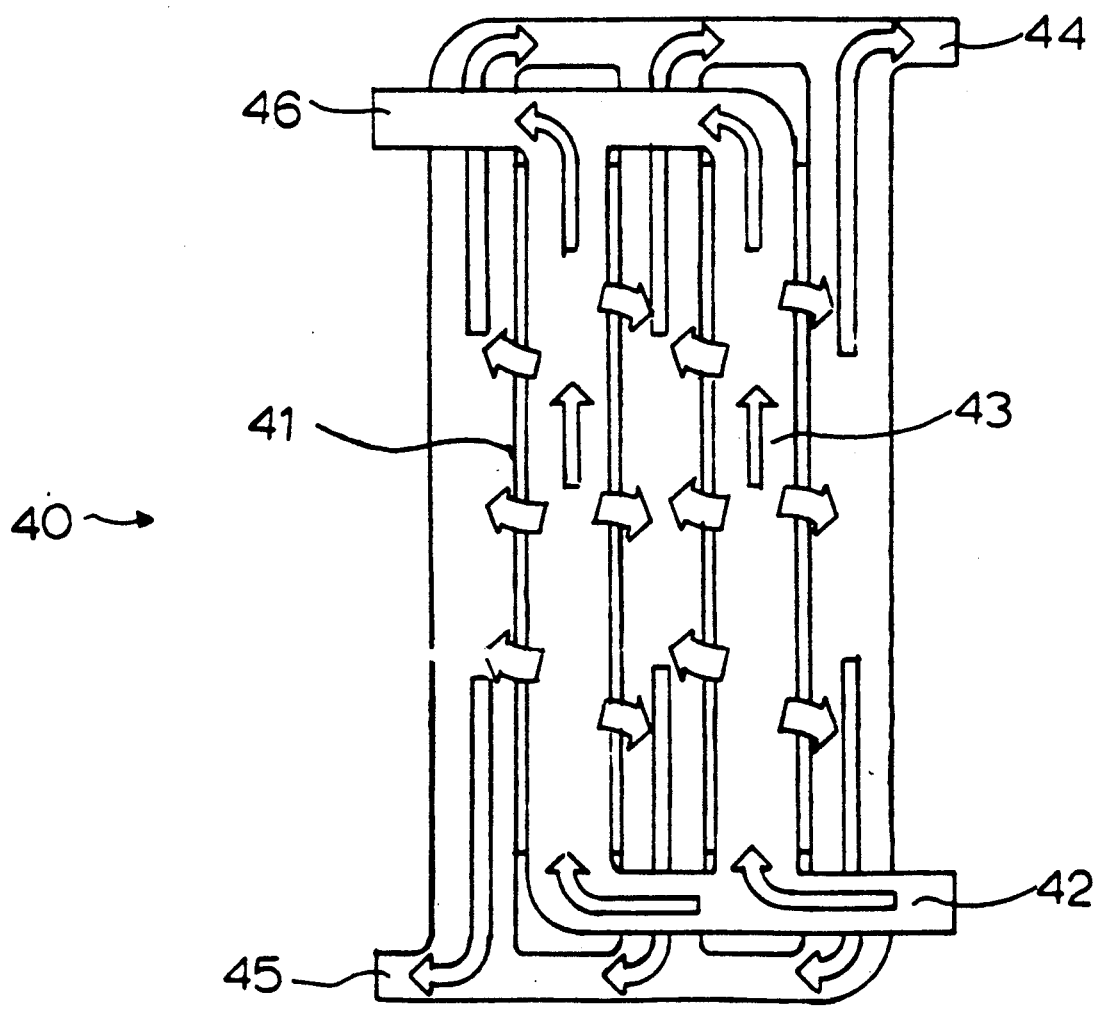

HYDROPHILIC MICROPOROUS MEMBRANE

FIELD OF THE INVENTION

The present invention relates to porous membranes that are prepared by oil-in-water polymerization systems.

BACKGROUND OF THE INVENTION

Porous membranes have been utilized for a variety of purposes such as ultrafiltration and reverse osmosis. They function as a screen or sieve and retain on their surface particles larger than their pore diameter.

There are many potential applications for porous membranes. For example, the smoking of tobacco has been widespread for many years and has resulted in substantial concerns regarding the health hazards caused by toxic components of tobacco smoke. Conventional fibrous filters have not been very satisfactory in reducing the amount of tar, carbon monoxide and other components of smoke.

Porous membranes have also been used to treat waste water, purify sewage, separate solvents from solutions containing particulates and in the desalination of sea water.

A variety of techniques have been utilized to prepare porous membrane filters. U.S. Pat. No. 3,100,721 describes a process for making a microporous film from nylons, polyesters and vinyl polymers by coating a polymer dispersion onto a cellophane sheet, treating the coating with water, drying the coating and stripping it from the cellophane sheet.

U.S. Pat. Nos. 3,642,668, 4,203,847 and 4,203,848 describe the production of a porous polyvinylidene fluoride film by coating a polymer solution on a substrate that is immersed in a leaching bath.

SUMMARY OF THE INVENTION

The present invention relates to a polymeric membrane having controlled pore size that is prepared in an oil in water system where the water is the continuous phase and the oil phase contains the polymer.

A pore forming agent is incorporated into the system. If the pore forming agent is a liquid it is incorporated into the discontinuous phase (oil phase). If the pore forming agent is a normally solid water soluble inorganic salt it is dissolved in the continuous phase.

The system is heated to evaporate the continuous phase and concentrate the discontinuous polymer containing phase so that crosslinking takes place. By varying the ionic strength of the pore forming agent one can effect the surface tension between the droplets or the discontinuous phase and the continuous phase. This results in controlled porosity.

The hydrophilic membranes produced in accordance with the present invention can be used in a variety of applications. For example, they can be used with or without a support and placed at the mouth end of a cigarette rod or in a pipe or cigarette holder to separate tar, carbon monoxide and other toxic components from tobacco smoke.

The hydrophilic membranes of the present invention can also be used in various oil-water separation processes where the major constituent of the liquid being treated is water.

BRIEF DESCRIPTION OF THE DRAWINGS

FIG. 1 is a cross sectional view of a membrane of the present invention coated on a support;

FIG. 2 is a longitudinal sectional view of a filter cigarette containing a membrane of the present invention;

FIG. 3 is a longitudinal sectional view of a second embodiment of a filter cigarette containing a membrane of the present invention;

FIG. 4 is a perspective view of a multichannel tubular module incorporating membranes of the present invention; and FIG. 5 is a sectional view of a flat sheet plate and frame module incorporating membranes of the present invention.

DETAILED DESCRIPTION OF THE INVENTION

The hydrophilic membranes of the present invention comprise a crosslinked, water-insoluble polymer having micropores of a controlled porosity.

Suitable polymers include those that are hydrophilic and have an affinity for polar compounds and water. Such polymers include cellulosics, polyvinyl alcohol, polyvinyl formal, polyvinyl pyrrolidone, polyacrylic acid, polyfurfuryl alcohol, and compatible mixtures thereof. Water soluble silicone polymers, for example silane terminated polyorganosilanes such as polydimethylsiloxane, polyoctamethyltrisiloxane and polyhexamethyldisiloxane, are also suitable. The polymer is generally present in the oil in water system in a concentration ranging from 2 to 15 percent by weight, preferably about 5 percent by weight. The number average molecular weight of these polymers can be in the range from about 50,000 to about 500,000.

Suitable pore forming agents can include water soluble inorganic salts such as sodium chloride, calcium chloride and sodium sulfate that are dissolved in the continuous phase. Alternatively, liquid pore forming agents such as polyalkylene glycol (polyethylene glycol, polypropylene glycol and the like) or an alkylsodium sulfonate such as sodium dodecylsulfonate can be dispersed in water at concentrations of about 0.15 to about 1.5 weight percent and form part of the discontinuous phase. The pore forming agents are generally present in the oil in water system in an amount in the range of from about 0.05 to about 30 percent by weight of the total system. When inorganic salts are utilized as the pore forming agent, the ionic strength of the salt-containing solution should be in the range of from about 0.01N to about 1.0N. When polymeric pore forming agents are utilized, their number average molecular weight is in the range of about 200 to about 100,000.

By controlling the ionic strength the relative surface tensions of the discontinuous phase and the continuous phase can be controlled. Thus, as the continuous phase is driven off, the pore forming agent causes the polymer chain to curl and entrap some water. The pore size can be controlled by varying the ionic strength and the amount of pore forming agent. For example, at a given concentration of polyethylene glycol the pore size can be decreased by reducing the concentration of the dissolved inorganic salt, and the pore size can be increased by increasing the concentration of the dissolved inorganic salt. Similarly, a decrease in the polyethylene glycol concentration at a constant dissolved inorganic salt concentration will decrease the pore size while an increase in the polyethylene glycol concentration at a constant inorganic salt concentration will increase the pore size. Combinations of the foregoing techniques can be utilized as well to modulate the surface tension and to maintain the pore size within the desired range. The diameter of the pores is generally in the range of from about 0.01 to 100 microns.

Similarly, as the continuous phase is driven off, the concentration of the bonding agent increases and linking of the polymer molecules as well as bonding of the produced polymer film to a suitable support takes place. Conventional bonding agents such as sodium tetraborate, aluminum hydroxide, oxalic acid, potassium dichromate and potassium chromate may be utilized for this purpose.

The resultant pores may form a direct or tortuous path through the film depending on the thickness of the film, the size of the pores and other factors.

The aqueous continuous phase generally contains a $C_1$ to $C_{16}$ water miscible aliphatic alcohol in an amount of about 5 to about 50 percent of the volume of water. The aliphatic portion of the alcohol can be either a straight chain or branched. The alcohol utilized will vary depending upon the intended use of the membrane. For example, $C_2$ to $C_5$ alcohols are preferred for membranes intended for use as cigarette filters.

The system can also contain surfactants if smaller micelles are desired. Suitable surfactants include conventional nonionic, cationic, anionic and all these types of surfactants perform acceptably. Specific examples of suitable surfactants are dodecyl sodium sulfate and alkyl sulfonate. Amphoteric surfactants such as lecithin or cocobetaine are also acceptable. The hydorphilic-lipophilic balance valve of the surfactant does not impact its suitability for use in this application.

The membranes can be used with or without a support member. If it is desired to use a support member, any suitable porous substrate can be used. The thickness of the support member is generally in the range of 0.02–30 mm and the pores generally have a diameter in the range of 5–100 microns. Representative support members include commerically available scrim cloth, large pore size filter paper and porous ceramic or plastic materials. It may also be desirable to pretreat the support member with an oxidizing agent to promote adhesion of the membrane film to the support member.

Representative porous support members are set forth in the following Table I:

TABLE I

| Porous Support | Support Composition | Porosity % | Pore Size μ | Thickness mm |
|---|---|---|---|---|
| scrim cloth | polypropylene | 30–55 | 50–200 | 0.05–0.5 |
|  | polyester | 30–55 | 50–200 | 0.05–0.5 |

TABLE I-continued

| Porous Support | Support Composition | Porosity % | Pore Size μ | Thickness mm |
|---|---|---|---|---|
| filter paper | polyamide | 30–55 | 50–200 | 0.05–0.5 |
|  | cellulose | 30–55 | 50–200 | 0.05–0.5 |
| porous ceramics | $Al_2O_3$ | 30–55 | 5–100 | 2–30 |
|  | diatomaceous earth | 40–65 | 5–100 | 2–30 |
|  | cordierite | 30–55 | 5–100 | 2–30 |
| porous plastics | polypropylene | 30–60 | 5–200 | 2–30 |
|  | polyethylene | 30–60 | 5–200 | 2–30 |
|  | ABS[1] resin | 30–60 | 5–200 | 2–30 |

The size and porosity is measured by the mercury pressing technique.
[1] Acrylonitrile-Butadiene-Styrene The membranes can be formed by conventional techniques such as casting, or by coating techniques such as immersion or spraying and dynamic forming when a support member is utilized.

When the porous membranes of the present invention are prepared by casting techniques, a 5 to 25 weight percent concentration of a suitable polymer in a water, organic solvent or mixed solvent system is prepared. From 1 to 8 percent by weight of a suitable pore forming agent is added and thoroughly mixed in the polymer solution. A layer having a thickness in the range of from about 0.1 to about 0.5 mm is applied to the surface of the support member or a substrate from which the membrane can be removed. A cross linking agent or coagulant is initially present or then added to cure the membrane and the pore forming agent is washed away. The membrane is then dried and ready for use.

If immersion techniques are utilized, the support member can be immersed in a 0.5–10.0 weight percent polymer solution for 3 to 300 seconds. The polymer coated support member is then immersed in a solution of a coagulant or cross linking agent for 3 to 10 minutes, rinsed and dried.

Sprays containing 0.5–5.0 weight percent polymer can also be used. The thickness of the membrane can be controlled by varying the spraying time and the polymer concentration.

When a dynamic forming technique is utilized, the porous support member is placed in a pressurized cylinder. Polymer in a concentration of about 3 to 200 ppm and a pore forming agent in a concentration of about 1 to 800 ppm are then added to a feed tank. The suspension is then pumped into the pressurized support member until the porous support member is saturated to the desired degree and dried.

The following Table II discloses representative systems for preparing membranes of the present invention:

TABLE II

| Manufacturing Technique | Materials Used | | Coagulant (or cross linking agent) | | Pore Size μ | Porosity % | % Pores Within Desired Range |
|---|---|---|---|---|---|---|---|
|  | Name | Concentration % | Name | Concentration % |  |  |  |
| Casting | PVA | 10–15 | Sodium Tetraborate | 3–5% 0.5–1.5 | 0.1–20 | 25–60 | 70–90 |
|  | PVF | 10–15 | $C_2H_5OH$ | 5–90 | 0.1–5 | 25–60 | 70–90 |
|  | PVP | 12–18 | $Na_2SO_4$ | 10–15 | 0.1–20 | 25–60 | 70–90 |
|  | PAA | 15–20 | $Al(OH)_3$ | 1.0–15 | 0.1–30 | 25–60 | 70–90 |
| Immersion | PVA | 0.5–5 | $K_2CrO_4$ $K_2Cr_2O_7$ | 1–5 0.5–sat | 1–50 | 20–40 | 50–70 |
|  | PVF | 0.5–5 | $C_2H_5OH$ | 3–90 | 1–20 | 20–40 | 50–70 |
|  | PVP | 1–7 | $Na_2SO_4$ | 10–25 | 1–50 | 20–40 | 50–70 |
|  | FFA | 0.3–3 | $H_2SO_4$ | 1–10 | 1–50 | 20–40 | 50–70 |

TABLE II-continued

| Manufacturing Technique | Materials Used | | Coagulant (or cross linking agent) | | Pore Size μ | Porosity % | % Pores Within Desired Range |
|---|---|---|---|---|---|---|---|
| | Name | Concentration % | Name | Concentration % | | | |
| Spray Painting | PAA | 0.5-5 | Al (OH)$_3$ | 1-15 | 1-50 | 20-40 | 50-70 |
| | PVA | 0.2-3 | H$_2$C$_2$O$_4$ | 0.5-5 | 0.1-25 | 15-35 | 50-70 |
| | PVF | 0.2-3 | C$_2$H$_5$OH | 5-90 | 0.1-25 | 15-35 | 50-70 |
| | PVP | 0.4-45 | Na$_2$SO$_4$ | 10-25 | 0.1-25 | 15-35 | 50-70 |
| Dynamically Formed Membrane | PAA | 0.2-3 | Al (OH)$_3$ | 1-15 | 0.1-25 | 15-35 | 50-70 |
| | PVA | 5-200 ppm | Na$_2$B$_4$O$_7$ | 0.5-1.5 | 5-150 | 30-60 | 70-90 |
| | PVF | 20-100 ppm | C$_2$H$_5$OH | 5-90 | 0.1-100 | 30-60 | 70-90 |
| | PVP | 5-200 ppm | Na$_2$SO$_4$ | 10-25 | 5-150 | 30-60 | 70-90 |
| | FFA | 5-200 ppm | H$_2$SO$_4$ | 1-10 | 5.0-150 | 30-60 | 70-90 |
| | PAA | 5-200 ppm | Al (OH)$_3$ | 0.5-2 | 0.5-150 | 30-60 | 70-90 |

PVA = poly vinyl alcohol
PAA = poly acrylic acid
PVF = poly vinyl formal
PVP = poly vinyl pyrrolidone
FFA = furfuryl alcohol FIG. 1 is a sectional view of a membrane 1 coated on the surface of a fibrous support member 2.

When the membrane is used as a device to separate tar, carbon monoxide and other toxic components from cigarette smoke, it is placed at the mouth end of the cigarette rod. It can be used by itself, with a support member or with a filter tip. When circular sections of membrane are used, one to four or more slices are generally used in the cigarette or pipe to remove toxic components from smoke.

Representative configurations for filter cigarettes using the membranes of the present invention are shown in FIGS. 2 and 3.

In FIG. 2 there is shown a filter cigarette 10 that has a tobacco rod 11 and a filter 12. The filter 12 has a plug wrap 13 that is generally paper and can be solid or perforated. The plug wrap 13 surrounds alternating sections of gas permeable plugs 14, 15 and 16 and membrane sections 17, 18 and 19. The plugs are porous and can be constructed of paper, cardboard, acetate or other suitable materials that permit smoke to pass through them to the smoker. The membrane sections can be unsupported or can be supported by a scrim.

FIG. 3 discloses an alternative embodiment in which the cigarette 20 comprises a tobacco rod 21 and a filter 22. The filter 22 comprises a plug wrap 23 that surrounds a porous plastic or ceramic matrix 24 that supports a membrane of the present invention which has been coated onto the matrix by immersion or other suitable techniques.

Pipe filters can be prepared by similar techniques.

In order to demonstrate the advantages of the membranes of the present invention, several experiments have been conducted. In one, a support member sheet having an area of 100×100 mm$^2$ of adhesive-bonded fabric (1.2 mm thick) is made from polypropylene 600. It is immersed in an ethanol/water mixture having 10% by volume ethanol and containing 5 weight percent polyvinyl alcohol having a number average molecular weight of 170,000 and 1.0 weight percent polyethylene glycol, which has a number average molecular weight of 6000, for 10 minutes, reimmersed in Na$_2$B$_4$O$_7$ saturated fluid at 40° C. for 60 minutes and blow dried at room temperature (30° C.) for 4 hours. It is then placed in a microwave oven for 3 minutes for dewatering, cleaned in fresh water for 2 hours and blow dried for another 2 hours. The membrane is then cut into circular shaped sheets of 8 mm diameter. This membrane is then placed between cigarette filters, or clipped between two cut fiber filter-tips (FIG. II). The results of the analysis of the membrane's performance is shown in Table III.

TABLE III

| Brand Items | M-0 | M-200 | CM-300 | K-0 | K-200 |
|---|---|---|---|---|---|
| humidity | 60% | 60% | 60% | 60% | 60% |
| puff No. | 8.7 | 8.7 | 9.4 | 8.0 | 8.0 |
| mean wt. | 0.961 g | 0.977 g | 1.011 g | 0.960 g | 0.981 g |
| No. tested | 20 | 20 | 15 | 20 | 15 |
| TPM mg/piece | 21.68 | 16.72 | 12.07 | 16.57 | 6.86 |
| tar mg/piece | 18.15 | 12.80 | 9.355 | 13.965 | 5.009 |
| nicotine mg/piece | 1.21 | 0.988 | 0.485 | 1.025 | 0.371 |
| CO (%) | n/a | n/a | n/a | 4.19 | 3.26 |

Index to Table III
M-0 Marlboro ® without membrane
M-200 Marlboro ®, membrane between filter & cigarette as depicted in FIG. 2.[2]
CM-300 Marlboro ®, membrane placed in accordance with FIG. 2.[3]
K-0 Kent ® without membrane
K-200 Kent ®, membrane placed in accordance with FIG. 3.[4]
[2]Membranes 17 and 18 were not present.
[3]Membranes 18 and 19 were not present. A vent hole in the filter upstream from the membrane was included.
[4]Membranes 18 and 19 were not present. A vent hole in the filter upstream of the membrane was included.

The results showed that the filter membranes have good capture of tar and CO. If the membrane and its location is changed, the permeability of smoke can be controlled. Thus two types of membrane filter-tips can be produced:
(1) low tar and low nicotine; and
(2) low tar and suitable high nicotine.

EXAMPLE

A polypropylene supported membrane was placed at the mouth end of a cigarette rod in Marlboro ® cigarettes and a gas sample was drawn so that all the smoke was absorbed in an alcohol solution. This was compared with unaltered Marlboro ® cigarettes. Using 5 cigarettes, the samples were absorbed in a 25 ml alcohol solution and immediately measured by spectro-photometer. At a wave length of 380, the concentration proportion of the two samples is 4:1. Therefore, the membrane results in a reduction of wet tar of 300% higher than the acetate filter.

FIG. 4 illustrates the use of porous membranes of the present invention in a tubular multichannel module 30. The module 30 contains a plurality of hollow thin walled tubular membranes 31 and rings 32 at both ends of the module 30 to fix the tubular members 31 in an appropriate position in the module 30.

FIG. 5 illustrates the use of porous membranes of the present invention in a plate and frame device 40. Flat sheets of membrane 41 are mounted in the device 40. The liquid being treated enters through inlet 42 and flows through channels 43. The permeate passes through the membranes 41 and exits through outlets 44 and 45. Retentate exits through outlet 46.

While the invention has been described in detail and with reference to specific embodiments thereof, it will be apparent to one skilled in the art that various changes and modifications can be made therein without departing from the spirit and scope thereof.

I claim:

1. A membrane having controlled porosity that is prepared in an oil-in-water system by a process that comprises the steps of:
   (a) forming an oil-in-water dispersion wherein the oil phase contains a hydrophilic polymer;
   (b) adding to the dispersion a pore forming agent and a crosslinking agent or a coagulant for the polymer to form a suspension;
   (c) casting the thus formed suspension on a substrate;
   (d) evaporating the water from the suspension cast on the substrate to concentrate and coagulate the polymer present while enveloping the pore forming agent with the polymer; and
   (e) removing the pore forming agent from the coagulated polymer.

2. A membrane as in claim 1 wherein the hydrophilic polymer is selected from the group consisting of polyvinyl alcohol, polyacrylic acid, polyturfuryl alcohol, polyvinylpyrrolidone and compatible mixtures thereof.

3. A membrane as in claim 1 wherein the pore forming agent is an inorganic salt.

4. A membrane as in claim 1 wherein the pore forming agent is polyethylene glycol.

5. A membrane as in claim 1 wherein the membrane is supported by a substrate.

6. A membrane as in claim 1 wherein the hydrophilic polymer is a silanol terminated polyorganosiloxane.

7. A filter for the separation of tar and other toxic components from tobacco smoke that comprises a hydrophilic polymer membrane having a porosity within a predetermined range made in accordance with the process of claim 1.

8. A filter as in claim 7 wherein the membrane pores have a diameter in the range of from about 0.01 to about 100 microns.

9. A filter as in claim 7 wherein the membrane is integral with a support member.

10. A filter as in claim 9 wherein the support member has pores with a diameter in the range of from about 5 to about 100 microns.

11. A filter as in claim 7 wherein the polymer is selected from the group consisting of polyvinyl alcohol, polyacrylic acid, polyfurfuryl alcohol, polyvinylpyrrolidone, and compatible mixtures thereof.

12. A filter as in claim 7 wherein the polymer is a silicone polymer selected from the group consisting of polydimethylsiloxane, polyoctamethyltrisiloxane, polyhexamethyldisiloxane and compatible mixtures thereof.

13. A filter as in claim 9 wherein the support member is selected from the group consisting of scrim cloth, filter paper, porous ceramic and porous plastic.

14. A cigarette comprising a tobacco rod and at least one membrane as in claim 7.

15. A cigarette as in claim 14 wherein more than one membrane is present.

16. A cigarette filter as in claim 14 wherein the membranes are separated from one another by gas permeable plugs.

* * * * *